United States Patent
Kennard et al.

(10) Patent No.: US 9,078,500 B2
(45) Date of Patent: *Jul. 14, 2015

(54) PROTECTIVE CASE FOR A MOBILE ELECTRONIC DEVICE

(71) Applicant: Fellowes, Inc., Itasca, IL (US)

(72) Inventors: Geoffrey Kennard, Chardon, OH (US); Marc Vitantonio, South Russell, OH (US); Patrick Brown, Cleveland Heights, OH (US)

(73) Assignee: FELLOWES, INC., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,014

(22) Filed: Jan. 9, 2015

(65) Prior Publication Data
US 2015/0122853 A1    May 7, 2015

Related U.S. Application Data

(63) Continuation of application No. 13/955,911, filed on Jul. 31, 2013, now Pat. No. 8,958,857.

(51) Int. Cl.
*H04M 1/00* (2006.01)
*A45C 11/00* (2006.01)

(52) U.S. Cl.
CPC ..................... *A45C 11/00* (2013.01)

(58) Field of Classification Search
USPC ............. 455/575.8, 186.2, 275.1, 566, 550.1; 361/369.02, 679.58, 679.26, 679.15
See application file for complete search history.

(56) References Cited

U.S. PATENT DOCUMENTS

| | | |
|---|---|---|
| 5,707,757 A | 1/1998 | Lee |
| 6,731,913 B2 | 5/2004 | Humphreys et al. |
| 7,496,195 B2 | 2/2009 | Kramer |
| 7,613,386 B2 | 11/2009 | Shimamura |
| 7,663,879 B2 | 2/2010 | Richardson et al. |

(Continued)

FOREIGN PATENT DOCUMENTS

| | | |
|---|---|---|
| CN | 201220290089 | 6/2012 |
| CN | 202525356 | 11/2012 |

(Continued)

OTHER PUBLICATIONS http://www.lifeproof.com/shop/us_en/iphone-5/iphone-5-case/; Jun. 5, 2013.

(Continued)

*Primary Examiner* — Joseph Arevalo
(74) *Attorney, Agent, or Firm* — Renner, Otto, Boisselle & Sklar, LLP.

(57) ABSTRACT

A protective case for a mobile electronic device includes a shell defining a cavity for receiving the device, a door hingedly connected to the shell at an edge of the shell such that the door rotates from a closed position to an open position, an internal wall dividing the cavity into a device side and an opening side, the internal wall having at least one aperture corresponding to at least one of a power port, a data port, or an audio port of the device, and at least one elastomeric seal disposed such that the at least one of the power port, the data port, or the audio port is accessible through the at least one aperture when the door is in the open position, and such that the at least one elastomeric seal seals the at least one aperture when the door is in the closed position.

12 Claims, 5 Drawing Sheets

(56) References Cited

U.S. PATENT DOCUMENTS

| | | |
|---|---|---|
| 8,295,896 B2 | 10/2012 | Jeon |
| 8,393,466 B2 | 3/2013 | Rayner |
| 8,399,764 B2 | 3/2013 | Klosky |
| 8,453,835 B2 | 6/2013 | So |
| 2006/0279924 A1 | 12/2006 | Richardson et al. |
| 2007/0158220 A1 | 7/2007 | Cleereman et al. |
| 2008/0015000 A1 | 1/2008 | Jung |
| 2010/0200456 A1 | 8/2010 | Parkinson |
| 2010/0298025 A1 | 11/2010 | Spence |
| 2012/0063073 A1 | 3/2012 | Harada et al. |
| 2012/0262618 A1 | 10/2012 | Weakly |
| 2012/0275025 A1 | 11/2012 | Parrill |
| 2012/0314354 A1 | 12/2012 | Rayner |
| 2013/0088130 A1 | 4/2013 | Rayner |
| 2013/0127309 A1 | 5/2013 | Wyner et al. |

FOREIGN PATENT DOCUMENTS

| | | |
|---|---|---|
| CN | 202552579 | 11/2012 |
| CN | 202652296 | 1/2013 |
| CN | 202841236 | 3/2013 |
| CN | 202872861 | 4/2013 |
| JP | 3040063 | 8/1997 |
| JP | 3045854 | 2/1998 |
| JP | 10284855 | 10/1998 |

OTHER PUBLICATIONS http://www.lifeproof.com/shop/us_en/iphone-5/lifeproof-lifejacket-float-for-fre-iphone . . . Jun. 5, 2013.
http://www.alibaba.com/product-gs/630249187/waterproof_and_dustproof_mobile_phone . . . Jun. 5, 2013.
http://seenice.en.alibaba.com/product/918591505-218398846/Hot_Selling_Waterproof . . . Jun. 5, 2013.
http://www.otterbox.com/iPhone5-Armor-Series-Case/ap110-iphone-5, default,pd.html Jun. 5, 2013.

PROTECTIVE CASE FOR A MOBILE ELECTRONIC DEVICE

FIELD OF THE INVENTION

The present disclosure relates generally to mobile electronic devices such as mobile telephones and smartphones, tablet computers, cellular-connected laptop computers, and similar devices. More particularly, the present disclosure relates to protective cases for mobile electronic devices.

BACKGROUND

Mobile electronic devices such as mobile telephones and smartphones, tablet computers, cellular-connected laptop computers, and similar devices are ever increasing in popularity. While these mobile electronic devices continue to evolve, with an ever increasing list of features and capabilities, the devices still suffer from a long-standing problem: their vulnerability to the elements. These devices are susceptible to damage from general wear and tear, most noticeably the scratching or the devices' bodies and screens. More importantly, the devices are vulnerable to damage from water and dust. Protective cases have therefore been developed in order to protect these devices.

Conventional protective cases offer somewhat enhanced face, side, and back scratch and shock protection for the mobile electronic device, but leave the screen, switches, and ports (e.g., headphone ports, power ports, data ports, etc.) exposed to the environment. Some models may include a screen protector that may be applied as a separate component from the protective case. As these screen protectors are not an incorporated component of the product, however, they protect the screen from scratching, but they do not protect the mobile electronic device from water or dust. Other conventional protective cases may provide some protection against water and dust, but only for the electronics and not the screen.

Protective cases that do provide water and dust protection for the complete devices may not allow for view and/or use of the device's touch screen when the device is in the protective case. More adept conventional protective cases may allow a user to view and use the device's touch screen when the device is inside the protective case. However, while these cases may provide enhanced protection for the complete electronic device, the protective cases are large and cumbersome, turning a small and, some would say, elegant mobile electronic device into a large, inelegant, plastic-covered device.

In addition, some of the more adept conventional protective cases protect ports (e.g., headphone ports, power ports, data ports, etc.) of the mobile device with rubber plugs at ends of rubber flaps. Typically, the plugs insert in the ports to seal the ports from water and dust ingress. The rubber plugs rely on friction from the mobile electronic device's ports to hold the plugs in place. This often results in loose plugs or in blocked ports when the plugs break off from the flaps. Also, when a plug is unplugged to gain access to a port, the flap is left hanging which increases the chances that the flap might catch on objects in the environment of the mobile electronic device and brake off. Also, in some protective cases, a user must continually hold the flap open with their fingers for continued access to the port because the rubbery flap resists pivoting and is biased towards getting the plug back in the port or towards the flap covering the port.

SUMMARY OF THE INVENTION

This disclosure provides a protective case for a mobile electronic device that protects the complete device and uses a door to protect the ports of the mobile electronic device. The door is hingedly attached to the rest of the case, which allows the door to easily pivot approximately 270 degrees from a closed position in which the ports are fully protected to an open position in which the door stows away into a recess. The door and the recess include complementary features that allow for the door to be retained securely in the fully open position. These features produce a tidy-looking design in which the door is also less prone to catch on items in its environment and break off.

The disclosed protective case provides weatherproof and dustproof protection for the complete mobile electronic device in a state where the mobile electronic device is operable for telephone calls, web browsing, interaction with apps, etc. The ports of the mobile electronic device are protected from water and dust when the door is in the closed position and become easily accessible by rotation of the door from the closed position to the fully open position. Also, the disclosed protective case provides protection against damage from general wear and tear including protection of the screen and body from scratching.

These and further features of the present invention will be described with reference to the attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
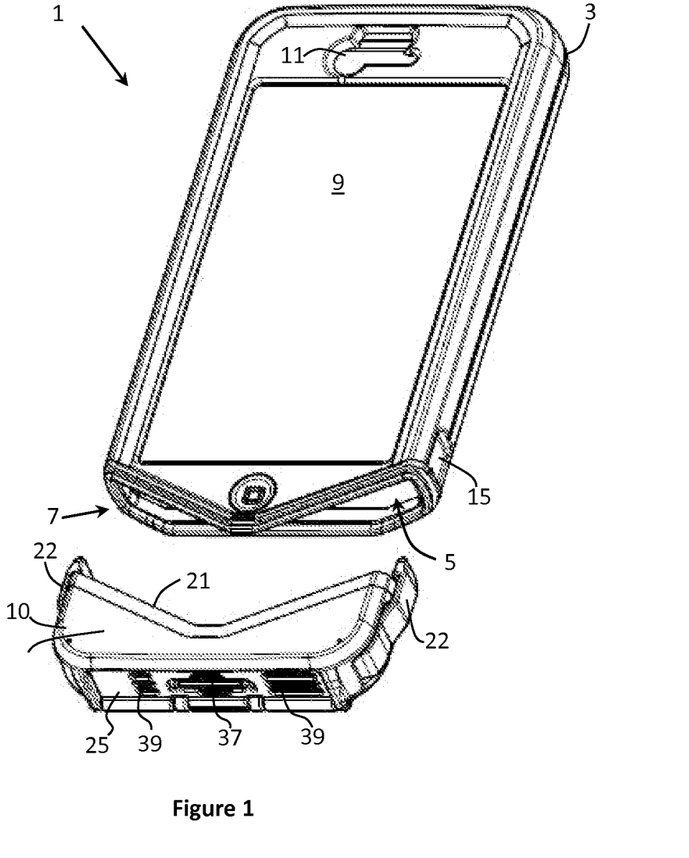
FIG. 1 illustrates an exploded view of an exemplary protective case for a mobile electronic device.

FIG. 1 illustrates an exploded view of an exemplary protective case 1 for a mobile electronic device. The case 1 includes a shell 3 that defines a cavity 5 with an open end 7 for receiving a portion of the mobile electronic device within the cavity 5. The case 1 also includes an end cap 10 that is removably connectable to the shell 3 at the open end 7 of the shell 3 to encase the electronic device. The case 1 includes a connection mechanism in the form of snap locks 22 in the end cap 10 and corresponding recesses 15 in the shell 3. The end cap 10 includes a door 25 that will be described in more detail below.

FIGS. 2A-5E illustrate the exemplary protective case 1 in further details. FIGS. 2A-2E illustrate the case 1 with the door 25 fully open. FIGS. 3A-3E illustrate the case 1 with the door 25 partially open. FIGS. 4A-4E illustrate the case 1 with the door 25 closed, but unlatched. FIGS. 5A-5E illustrate the case 1 with the door 25 closed and latched.

As shown in FIGS. 2A, 3A, 4A and 5A, the shell 3 includes a protective membrane 9 located to correspond to the location of a screen of the mobile electronic device. The protective membrane 9 allows viewing of the screen of the device and may allow for the use of touchscreen features of the device's screen. The shell 3 further includes a water and dust resistant acoustic vent 11 located to correspond to the speaker of the mobile electronic device. As shown in FIGS. 2B, 3B, 4B, and 5B, the shell 3 also includes a protective membrane 13 located to correspond to the camera lens of the mobile electronic device.

In one embodiment, the shell 3 is substantially comprised of a unitary shell. In other embodiments (not shown), the shell 3 may be comprised of multiple portions (e.g., front and back halves) that assemble together to form the shell 3.

As disclosed above, the case 1 also includes the end cap 10, which includes a main cap portion 20 that includes a first end 21 that connects to the shell 3. A connection mechanism provides the connection between the end cap 10 and the shell 3 that is releasable. In the illustrated embodiment the connection mechanism includes two snap locks 22 attached to the end cap 10 that snap and lock to corresponding recesses 15 in the shell 3. In other embodiments the connection mechanism may be other than snap locks and recesses.

Figure 2A:
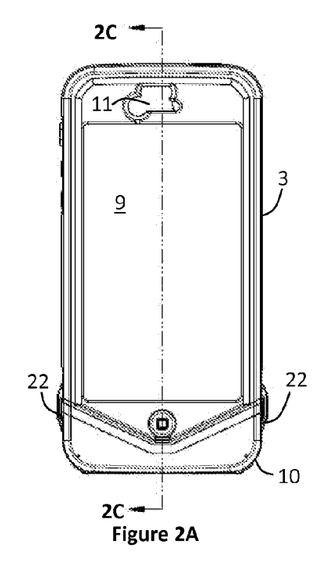
FIG. 2A illustrates a front view of the exemplary protective case of FIG. 1 with its door fully open.
Figure 2B:
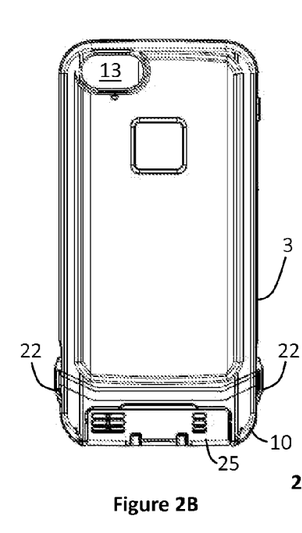
FIG. 2B illustrates a rear view of the exemplary protective case of FIG. 1 with its door fully open.
Figure 2C:
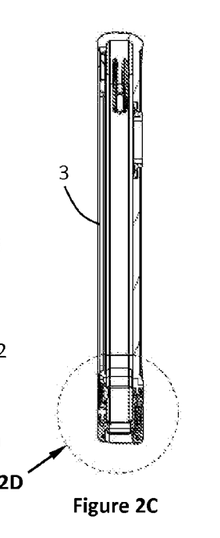
FIG. 2C illustrates a cross section of the exemplary protective case with its door fully open as indicated by FIG. 2A.
Figure 2D:
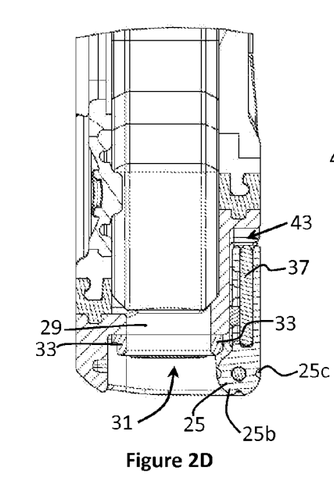
FIG. 2D illustrates a magnified view of a portion of the exemplary protective case with its door fully open as indicated by FIG. 2C.
Figure 2E:
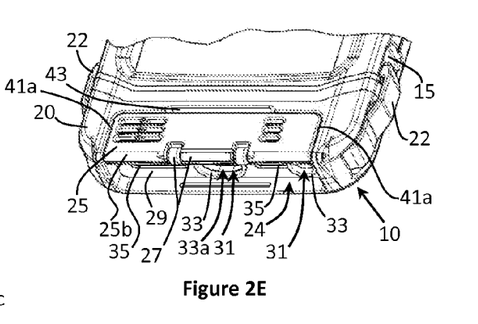
FIG. 2E illustrates a cutout view of a portion of the exemplary protective case with its door fully open.
Figure 3A:
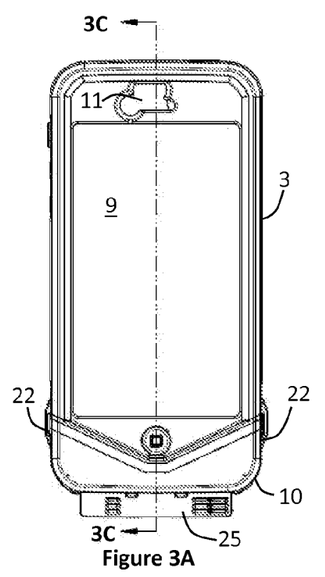
FIG. 3A illustrates a front view of the exemplary protective case of FIG. 1 with its door partially open.
Figure 3B:
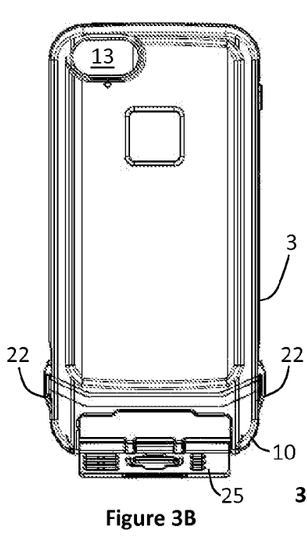
FIG. 3B illustrates a rear view of the exemplary protective case of FIG. 1 with its door partially open.
Figure 3C:
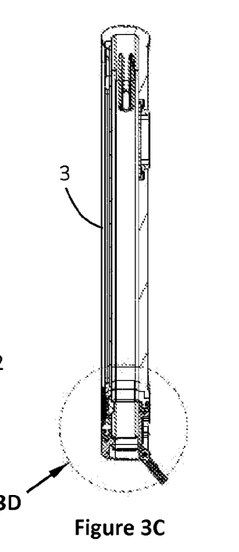
FIG. 3C illustrates a cross section of the exemplary protective case with its door partially open as indicated by FIG. 3A.
Figure 3D:
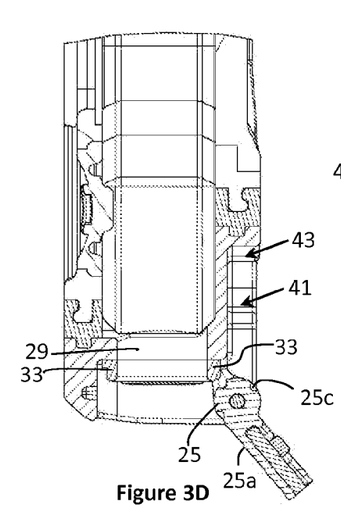
FIG. 3D illustrates a magnified view of a portion of the exemplary protective case with its door partially open as indicated by FIG. 3C.
Figure 3E:
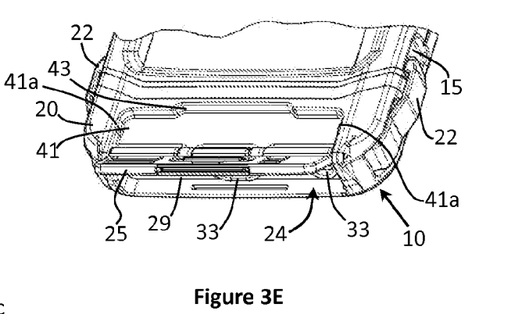
FIG. 3E illustrates a cutout view of a portion of the exemplary protective case with its door partially open.

As shown in FIGS. 2E and 3E, at the opposite end from the connection between end cap 10 and shell 3, the end cap 10 includes an opening 24. The end cap 10 also includes the door 25 and a hinged connection 27 between the door 25 and the main cap portion 20. The hinged connection 27 between the door 25 and the main cap portion 20 is provided near an edge of the main cap portion 20. As shown in the progression from FIGS. 2A-2E to FIGS. 3A-3E to FIGS. 4A-4E, the door 25 rotates about the hinged connection 27 approximately 270 degrees from the fully open position to the partially open position to the closed position, respectively. In the closed position shown in FIG. 4E, the door 25 substantially closes the opening 24 of the main cap portion 20.

In one embodiment, the hinged connection 27 includes at least one pin (not shown) that connects to the main cap portion 20 and the door 25 so that the door 25 may rotate about the pin. In one embodiment, the door 25 includes a cylindrical portion 25$b$ that extends along the hinged connection 27 and provides the door portion of the hinged connection 27 between the door 25 and the main cap portion 20. In one embodiment, the cylindrical portion 25$b$ includes grips or knurls 25$c$ to grip the skin of a finger of a user applying a tangential rotational force to the cylindrical portion 25$b$ to incite the door 25 to rotate about the hinged connection 27.

As shown in FIGS. 2D-2E, 3D-3E, 4D and 5D the main cap portion 20 includes an internal wall 29 that divides the cavity 5 of the case 1 into a mobile electronic device side of the cavity and an opening 24 side of the cavity. The internal wall 29 has apertures 31 that correspond to ports of the mobile electronic device such as, for example, a power port, a data port, or an audio port of the mobile electronic device. The internal wall 29 may include one or more apertures 31 depending on the mobile electronic device.

Disposed in the opening 24 are elastomeric seals 33. The elastomeric seals 33 have seal apertures 33A that align with the apertures 31 of the internal wall 29 that correspond to the ports of the mobile electronic device. The ports (e.g., power port, data port, audio port, etc.) of the mobile electronic device are accessible through the apertures 31 and the seal apertures 33A when the door 25 is in the open position as shown in FIG. 2A-2E. As shown in FIGS. 2D-2E, 3D-3E, 4D and 5D, the seals 33 extend away from the internal wall 29 towards the opening 24. One or more seals 33 may be included depending on the mobile electronic device.

Figure 4A:
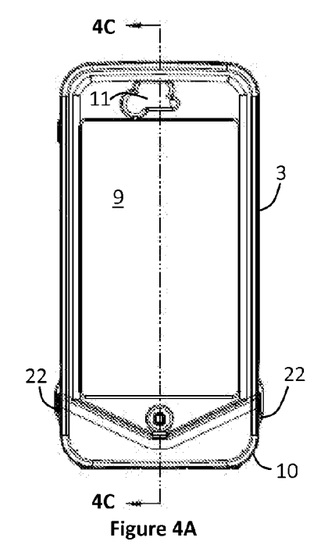
FIG. 4A illustrates a front view of the exemplary protective case of FIG. 1 with its door closed.
Figure 4B:
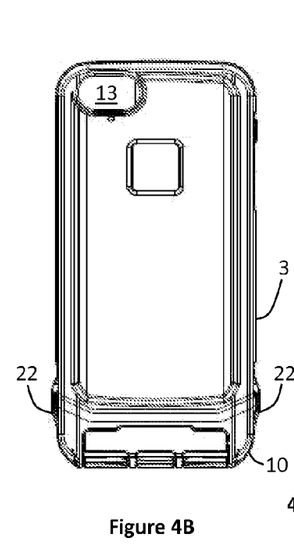
FIG. 4B illustrates a rear view of the exemplary protective case of FIG. 1 with its door closed.
Figure 4C:
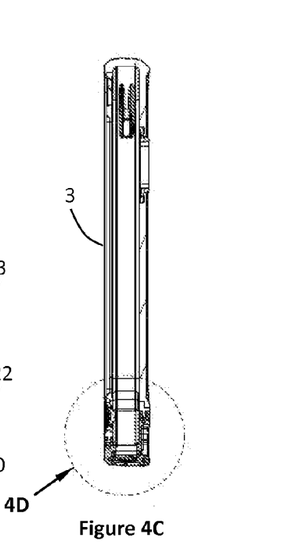
FIG. 4C illustrates a cross section of the exemplary protective case with its door closed as indicated by FIG. 4A.
Figure 4D:
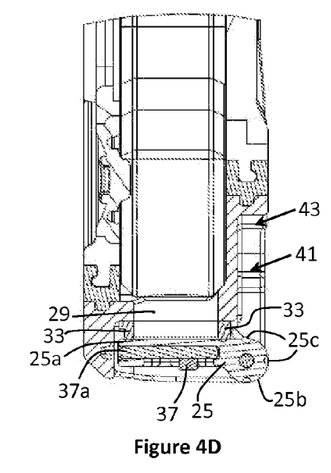
FIG. 4D illustrates a magnified view of a portion of the exemplary protective case with its door closed as indicated by FIG. 4C.

As discussed above and as shown in the progression from FIGS. 2A-2E to FIGS. 3A-3E to FIGS. 4A-4E, the door 25 rotates about the hinged connection 27 approximately 270 degrees from the fully open position to the partially open position to the closed position, respectively. In the closed position, the door 25 substantially closes the opening 24 of the main cap portion 20. In the closed position, as shown in FIGS. 4D and 5D, the seals 33 and the door 25 interact. The seals 33 are made of an elastomer material such as rubber. The door 25 is made of a comparatively rigid material such as PVC or Lexan and its wall 25$a$ has a relatively smooth surface. Thus, although in the illustrations of FIGS. 4D and 5D the interface between the seals 33 and the door 25 is shown as an interference, in practice, force exerted on the seals 33 by the wall 25$a$ of the door 25 causes the seals 33 to temporarily deform or contract to, together with the wall 25$a$, form seals that seal the apertures 31. The seals 33 have dimensions that permit the interaction between the seals 33 and the door 25 when the door 25 is in the closed position.

Figure 5A:
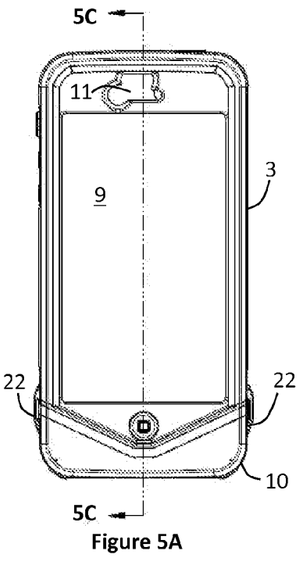
FIG. 5A illustrates a front view of the exemplary protective case of FIG. 1 with its door closed and latched.
Figure 5B:
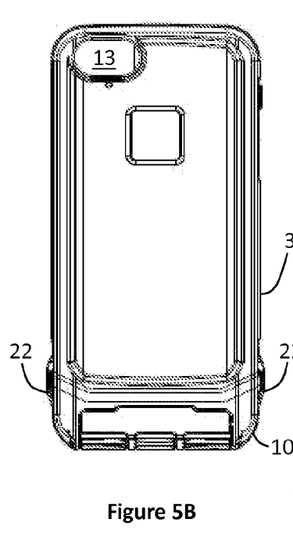
FIG. 5B illustrates a rear view of the exemplary protective case of FIG. 1 with its door closed and latched.
Figure 5C:
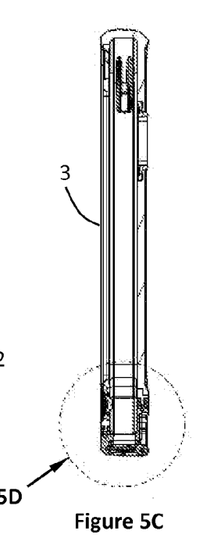
FIG. 5C illustrates a cross section of the exemplary protective case with its door closed and latched as indicated by FIG. 5A.
Figure 5D:
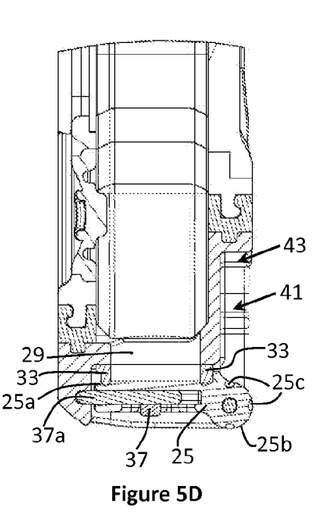
FIG. 5D illustrates a magnified view of a portion of the exemplary protective case with its door closed and latched as indicated by FIG. 5C.
Figure 5E:
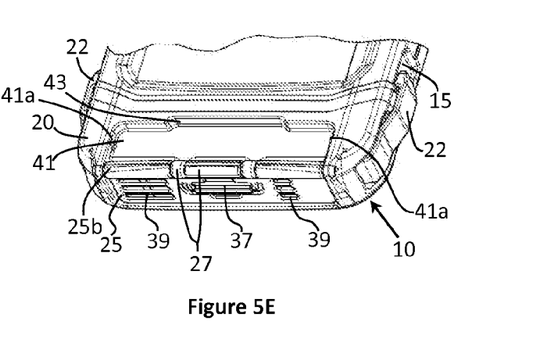
FIG. 5E illustrates a cutout view of a portion of the exemplary protective case with its door closed and latched.

To retain the door 25 in the closed position, the door 25 includes a latch 37 disposed within the door 25. The latch 37 is slidable such that in a latched position, as shown in FIGS. 5D and 5E, a latching portion 37a of the latch 37 protrudes from a side of the door 25 and into a corresponding latch receiving portion of the main cap portion 20. This way the door 25 is securely latched in the closed position.

As shown in FIG. 2E, the internal wall 29 also has apertures 35 corresponding to speakers and/or microphones of the mobile electronic device and the end cap 10 includes acoustic vents (not shown) aligned with the apertures 35 to allow sound to travel through the apertures 35 while preventing ingress of liquids into the mobile electronic device side of the cavity 5. Corresponding to the apertures 35, the door 25 has grills 39 disposed on the wall 25a of the door 25. The grills 39 align with the acoustic vents and the apertures 35 corresponding to the speakers and/or microphone of the mobile electronic device to allow sound to travel through the grills. The numbers and sizes of the apertures 35 and the grills will vary depending on the mobile electronic device.

When the door 25 is closed and latched, as shown in FIGS. 5A-5E, the case 1 fully encloses the mobile electronic device. The case 1 provides scratch protection and shock absorption around the mobile electronic device as well as protection from the environment such as protection from water, dirt, and dust. Thus the disclosed features provides a solution that allows for weatherproof and dustproof protection of the mobile electronic device in a state where the mobile electronic device is operable for a substantial number of operations including telephone calls, web browsing, interaction with apps, etc.

Figure 4E:
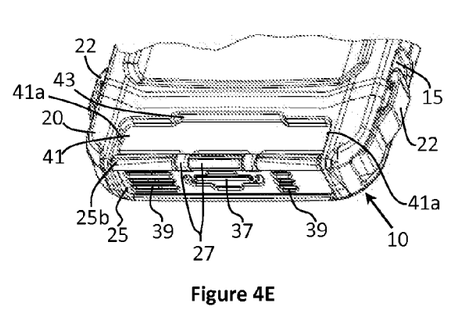
FIG. 4E illustrates a cutout view of a portion of the exemplary protective case with its door closed.

To release the door 25 from the closed position, the latch 37 may be slid to an unlatched position as shown in FIGS. 4D and 4E. In the unlatched position the latching portion 37a retracts from the corresponding latch receiving portion of the main cap portion 20. Where the cylindrical portion 25b includes the grips or knurls 25c, a user may apply a tangential rotational force to the cylindrical portion 25b to incite the door 25 to rotate about the hinged connection 27 to open.

As disclosed above, the door 25 rotates about the hinged connection 27 approximately 270 degrees. Thus the door 25 rotates from the closed position to the partially open position to the fully open position as shown in the progression from FIGS. 4A-4E to FIGS. 3A-3E to FIGS. 2A-2E, respectively.

The main cap portion 20 includes a recess 41 that has a shape that corresponds to the outer shape of the door 25. In the fully open position of the door 25, the recess 41 receives the door 25 or at least a substantial portion of it. The recess includes features 41a that pinch the door 25 and thus secure the door 25 in the recess 41. In one embodiment, the door 25 instead of the recess 41 includes features that secure the door 25 in the recess 41. In yet another embodiment, both the door 25 and the recess 41 include features to secure the door 25 in the recess 41.

The main cap portion 20 also includes a notch 43 adjacent to the recess 41. The notch 43 allows a finger or a fingernail of a user at least partial access to the side or bottom of the door 25 when the door 25 is secured in the recess 41 such that the user may apply a rotational force to the door 25 to incite release of the door 25 from the recess 41 and the features 41a for the door 25 to rotate about the hinged connection 27.

These disclosed features represent improvements over the prior art. The 270 degree rotation of the door 25 in combination with the recess 41 and the features 41a produces a secure stow-away location for the door 25 in which the door 25 is substantially flush with the rest of the case 1. Thus in the fully open position the door 25 is out of the way and less prone to catch on items in its environment and break off. These features also eliminate the prior art need to hold open flaps that provide access to the ports of the mobile electronic device.

In the closed position, the door 25 is similarly out of the way and less prone to catch on items in its environment and break off. The door 25 in the closed position in combination with the other disclosed features provides a solution that allows for weatherproof and dustproof protection of the mobile electronic device in a state where the mobile electronic device is operable for a substantial number of operations including telephone calls, web browsing, interaction with apps, etc. From the closed position the ports of the mobile electronic device become easily accessible by operation of the latch 39 and rotation of the door 25 to the fully open position.

Although the illustrated protective case 1 corresponds to a specific mobile electronic device (i.e., an Apple iPhone), it should be understood that the features of the disclosed invention may be available for other mobile electronic devices.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

The invention claimed is:

1. A protective case for a mobile electronic device comprising:
   a shell defining a cavity for receiving the mobile electronic device within the cavity, the shell having an opening; and
   a door hingedly connected to the shell at an edge of the shell such that the door rotates about the hinged connection from a closed position to an open position and from the open position to the closed position, the door including a latch disposed such that, in a latched position, the latch protrudes from a side of the door and engages a corresponding latch receiving portion of the shell to latch the door in the closed position,
   the shell comprises:
   an internal wall dividing the cavity into a mobile electronic device side of the cavity and an opening side of the cavity, the internal wall having at least one aperture corresponding to at least one of a power port, a data port, or an audio port of the mobile electronic device, and at least one elastomeric seal disposed relative to the at least one aperture corresponding to the at least one of the power port, the data port, or the audio port of the mobile electronic device of the internal wall such that the at least one of the power port, the data port, or the audio port of the mobile electronic device is accessible through the aperture when the door is in the open position, and such that, when the door is latched in the closed position, the at least one elastomeric seal seals the aperture corresponding to the at least one of the power port, the data port, or the audio port of the mobile electronic device.

2. The protective case of claim 1 comprising:

at least one pin connected to the shell and the door to provide the hinged connection between the shell and the door for the door to rotate about the at least one pin.

3. The protective case of claim 1 comprising:

an end cap disposed at an open end of the shell to encase the electronic device.

4. The protective case of claim 3, the end cap comprising:

at least part of a connection mechanism for connecting the end cap to the shell.

5. The protective case of claim 3, the end cap comprising:

an end cap door hingedly connected to the shell such that the end cap door rotates about the hinged connection to the shell from a closed position to an open position.

6. The protective case of claim 1 wherein:

the internal wall having at least one aperture corresponding to at least one of a speaker or a microphone of the mobile electronic device.

7. A protective case for a mobile electronic device comprising:

a shell defining a cavity for receiving the mobile electronic device within the cavity;

a door hingedly connected to the shell at an edge of the shell such that the door rotates about the hinged connection from a closed position to an open position and from the open position to the closed position, the door and the shell each including a latching mechanism disposed such that, in a latched position, at least one of the latching mechanism of the door and the latching mechanism of the shell protrudes such that the latching mechanism of the door engages the latching mechanism of the shell to latch the door in the closed position;

an internal wall dividing the cavity into a mobile electronic device side of the cavity and an opening side of the cavity, the internal wall having at least one aperture corresponding to at least one of a power port, a data port, or an audio port of the mobile electronic device; and at least one elastomeric seal that is disposed such that the at least one of the power port, the data port, or the audio port of the mobile electronic device is accessible through the at least one aperture when the door is in the open position, and such that the at least one elastomeric seal seals the at least one aperture corresponding to the at least one of the power port, the data port, or the audio port of the mobile electronic device when the latched door is in the closed position.

8. The protective case of claim 7 comprising:

at least one pin connected to the shell and the door to provide the hinged connection between the shell and the door for the door to rotate about the at least one pin.

9. The protective case of claim 7 comprising:

an end cap disposed at an open end of the shell to encase the electronic device.

10. The protective case of claim 9, the end cap comprising:

at least part of a connection mechanism for connecting the end cap to the shell.

11. The protective case of claim 9, the end cap comprising:

an end cap door hingedly connected to the shell such that the end cap door rotates about the hinged connection to the shell from a closed position to an open position.

12. The protective case of claim 1 wherein:

the internal wall having at least one aperture corresponding to at least one of a speaker or a microphone of the mobile electronic device.

\* \* \* \* \*